(12) United States Patent
Gusler et al.

(10) Patent No.: US 6,490,690 B1
(45) Date of Patent: Dec. 3, 2002

(54) METHOD AND APPARATUS FOR UNIX SYSTEM CATASTROPHIC RECOVERY AID

(75) Inventors: Carl Phillip Gusler, Austin, TX (US); Rick A. Hamilton, II, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/359,610

(22) Filed: Jul. 22, 1999

(51) Int. Cl.$^7$ ................................................ H02H 3/05
(52) U.S. Cl. ............................................ 714/4; 714/15
(58) Field of Search ......................... 714/4, 7, 15, 20, 714/38; 717/4; 709/221, 224

(56) References Cited

U.S. PATENT DOCUMENTS

| | | | | |
|---|---|---|---|---|
| 4,503,535 A | * | 3/1985 | Budde et al. | |
| 5,664,010 A | * | 9/1997 | Walker et al. | 379/207 |
| 5,734,831 A | * | 3/1998 | Sanders | 709/223 |
| 5,889,935 A | | 3/1999 | Ofek et al. | 395/182.04 |
| 5,931,954 A | * | 8/1999 | Hoshina et al. | 714/15 |
| 6,311,326 B1 | * | 10/2001 | Shagam | 717/4 |

* cited by examiner

*Primary Examiner*—Dieu-Minh Le
(74) *Attorney, Agent, or Firm*—Duke W. Yee; David A. Mims, Jr.; Lisa L. B. Yociss

(57) ABSTRACT

Initially, a configuration script is stored either remotely or locally on a system. The configuration script is executed based on a set of predefined execution parameters, such as time based parameters, system usage or loading parameters, or even based on the types of operations being performed on the system. Once executed, the configuration script outputs a series of current configuration parameters to a safe storage area. These current configuration parameters define the system in terms of system hardware specifics, software specifics, and firmware specifics, including mappings from logical to physical disk drives. By recording such detailed information in a methodical form and preserving it in an accessible state, a script may be written to place every logical volume, every file system, and every block of data back onto its disk of origin, even if the disk arrays stretch into terabytes. By detailing all relevant system parameters, output can be fed as input into a reconstruction script, which can then be written by anyone skilled in UNIX administration, provided the administrator has the comprehensive system environment description generated by the present invention.

46 Claims, 5 Drawing Sheets

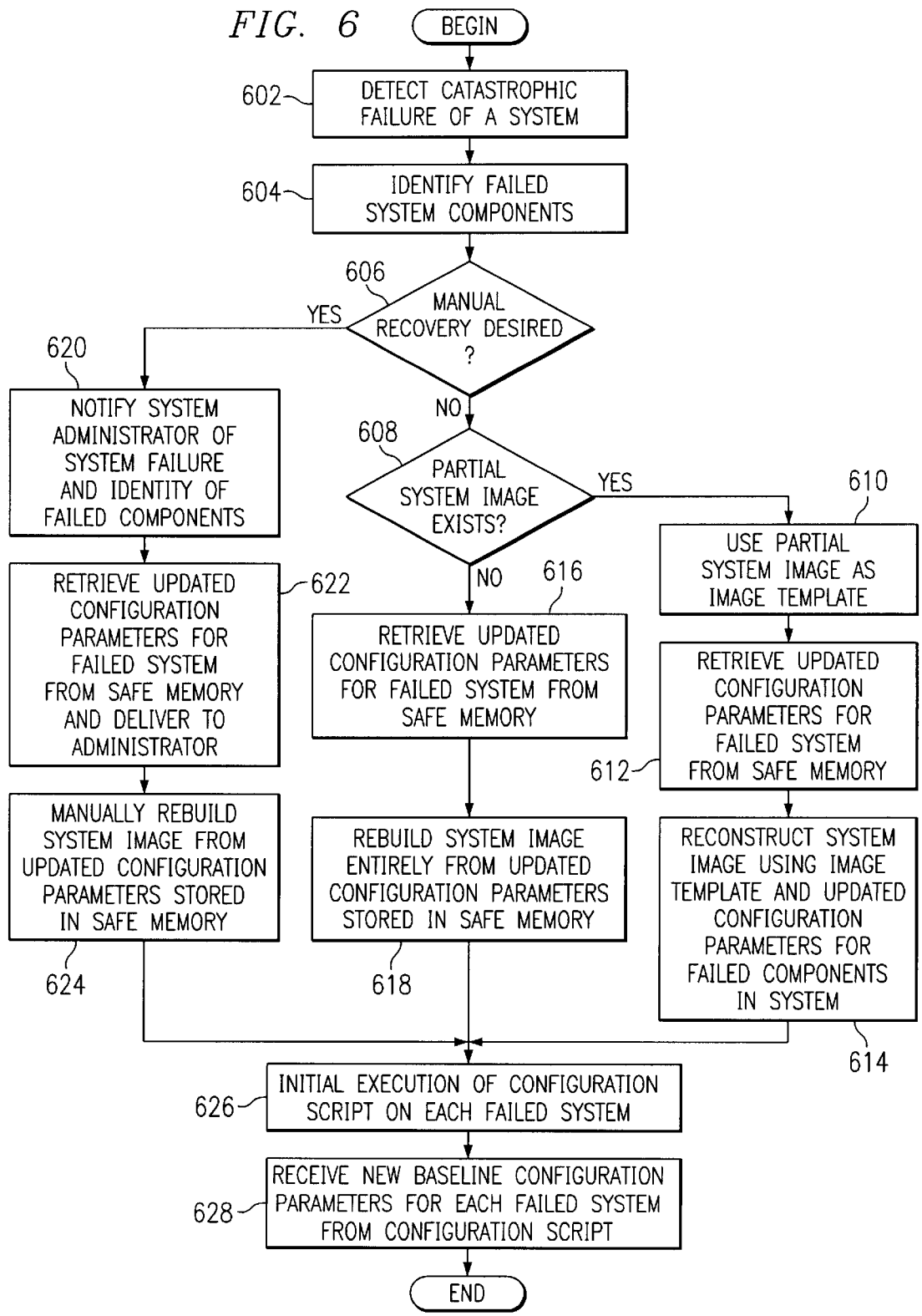

METHOD AND APPARATUS FOR UNIX SYSTEM CATASTROPHIC RECOVERY AID

BACKGROUND OF THE INVENTION

1. Technical Field

The present invention relates to system services technology. More particularly, the present invention relates to system fault recovery. Still more particularly, the present invention relates to a system and apparatus for recovering from a catastrophic system failure.

2. Description of Related Art

The UNIX operating system, or "UNIX," "A weak pun on Multics," is an interactive time-sharing operating system invented in 1969 by Ken Thompson after he left Bell Labs and the Multics project., apparently to play games on his scavenged PDP-7 computer (minicomputer sold by Digital Electric Corp. (DEC), (Compaq Computer Corp., 20555 SH 249, Houston, Tex. 77070)). Thompson developed a new programming language 'B', and Dennis Ritchie enhanced 'B' to 'C' and helped develop 'UNIX'.

The UNIX operating system is a multi-user operating system supporting serial or network connected terminals for more than one user. It supports multi-tasking and a hierarchical directory structure for the organization and maintenance of files. UNIX is portable, requiring only the kernel (<10%) written in assembler, and supports a wide range of support tools including development, debuggers, and compilers.

The UNIX operating system consists of the kernel, shell, and utilities. The kernel schedules tasks, manages data/file access and storage, enforces security mechanisms, and performs all hardware access. The shell presents each user with a prompt, interprets commands typed by a user, executes user commands, and supports a custom environment for each user. Finally, the utilities provide file management (rm, cat, ls, rmdir, mkdir), user management (passwd, chmod, chgrp), process management (kill, ps), and printing (lp, troff, pr).

A multi-user operating system allows more than one user to share the same computer system at the same time. It does this by time-slicing the computer processor at regular intervals between the various people using the system. Each user gets a set percentage of some amount of time for instruction execution during the time each user has the processor. After a user's allotted time has expired, the operations system intervenes, saving the program's state (program code and data), and then starts running the next user's program (for the user's set percentage of time). This process continues until, eventually, the first user has the processor again.

It takes time to save/restore the program's state and switch from one program to another (called dispatching). This action is performed by the kernel and must execute quickly, because it is important to spend the majority of time running user programs, not switching between them. The amount of time that is spent in the system state (i.e., running the kernel and performing tasks like switching between user programs) is called the system overhead and should typically be less than 10%.

Switching between user programs in main memory is done by part of the kernel. Main system memory is divided into portions for the operating system and user programs. Kernel space is kept separate from user programs. Where there is insufficient main memory to run a program, some other program residing in main memory must be written out to a disk unit to create some free memory space. A decision is made about which program is the best candidate to swap out to disk. This process is called swapping. When the system becomes overloaded (i.e., where there are more people than the system can handle), the operating system spends most of its time shuttling programs between main memory and the disk unit, and response time degrades.

In UNIX operating systems, each user is presented with a shell. This is a program that displays the user prompt, handles user input, and displays output on the terminal. The shell program provides a mechanism for customizing each/ user setup requirements, and storing this information for re-use (in a file called .profile).

When the UNIX operating system starts up, it also starts a system process (getty) which monitors the state of each terminal input line. When getty detects that a user has turned on a terminal, it presents the logon prompt; and once the password is validated, the UNIX system associates the shell program (sh) with that terminal. Each user interacts with sh, which interprets each command typed. Internal commands are handled within the shell (set, unset); external commands are invoked as programs (ls, grep, sort, ps).

Multi-tasking operating systems permit more than one program to run at once. This is done in the same way as a multi-user system, by rapidly switching the processor between the various programs. OS/2, available from IBM Corporation, One New Orchard Road, Armonk, N.Y. 10504; and Windows 95, available from Microsoft Corporation, One Microsoft Way, Redmond, Wash. 98052, are examples of multi-tasking single-user operating systems. UNIX is an example of a multi-tasking multi-user operating system. A multi-user system is also a multi-tasking system. This means that a user can run more than one program at once, using key selections to switch between them. Multi-tasking systems support foreground and background tasks. A foreground task is one the user interacts directly with using the keyboard and screen. A background task is one that runs in the background (i.e., It does not have access to the screen or keyboard.). Background tasks include operations like printing, which can be spooled for later execution.

The role of the operating system is to keep track of all the programs, allocating resources like disks, memory, and printer queues as required. To do this, it must ensure that one program does not get more than its fair share of the computer resources. The operating system does this by two methods: scheduling priority, and system semaphores. Each program is assigned a priority level. Higher priority tasks (like reading and writing to the disk) are performed more regularly. User programs may have their priority adjusted dynamically, upwards or downwards, depending upon their activity and available system resources. System semaphores are used by the operating system to control system resources. A program can be assigned a resource by getting a semaphore (via a system call to the operating system). When the resource is no longer needed, the semaphore is returned to the operating system, which can then allocate it to another program.

Disk drives and printers are serial in nature. This means that only one request can be performed at any one time. In order for more than one user to use these resources at once, the operating system manages them via queues. Each serial device is associated with a queue. When a user program wants access to the disk, for example, it sends the request to the queue associated with the disk. The operating system runs background tasks (called daemons), which monitor these queues and service requests from them. A request is then performed by this daemon process, and the results are sent back to the user's program.

Multi-tasking systems provide a set of utilities for managing processes. In UNIX, these are ps (list processes), kill (kill a process), and & (run a process in the background). In UNIX, all user programs and application software use the system call interface to access system resources like disks, printers, memory etc. The system call interface in UNIX provides a set of system calls (C functions). The purpose of the system call interface is to provide system integrity. As all low level hardware access is under control of the operating system, this prevents a program from corrupting the system.

The operating system, upon receiving a system call, validates its authenticity or permission, then executes it on behalf of the program, after which it returns the results. If the request is invalid or not authenticated, then the operating system does not perform the request but simply returns an error code to the program. The system call is accessible as a set of 'C' functions, as the majority of UNIX is also written in 'C'. Typical system calls are: _read—for reading from the disk unit; _write—for writing to the disk unit; _getch—for reading a character from a terminal; _putch—for writing a character to the terminal; and _ioctl—for controlling and setting device parameters.

The fundamental structure that the UNIX operating system uses to store information is the file. A file is a sequence of bytes, typically 8 bits long, and is equivalent to a character. UNIX keeps track of files internally by assigning each one a unique identifying number. These numbers, called inode numbers, are used only within the UNIX operating system kernel itself. While UNIX uses inode number to refer to files, it allows users to identify each file by a user-assigned name. A file name can be any sequence containing from one to fourteen characters.

There are three types of files in the UNIX file system: (1) ordinary files, which may be executable programs, text, or other types of data used as input or produced as output from some operation; (2) directory files, which contain lists of files; and (3) special files, which provide a standard method of accessing I/O devices.

UNIX provides users with a way of organizing files. Files may be grouped into directories. Internally, a directory is a file that contains the names of ordinary files and other directories, and their corresponding inode numbers. Given the name of a file, UNIX looks in the file's directory and obtains the corresponding inode number for the file. With this inode number, UNIX can examine other internal tables to determine where the file is stored and make it accessible to the user. UNIX directories themselves have names, each of which may also contain fourteen characters.

Just as directories provide a means for users to group files, UNIX supports the grouping of directories into a hierarchical file system. At the very top of a hierarchy is a directory. It may contain the names of individual files and the names of other directories. These, in turn, may contain the names of individual files and still other directories, and so on. A hierarchy of files is the result. The UNIX file hierarchy resembles an upside-down tree, with its root at the top. The various directories branch out until they finally trace a path to the individual files, which correspond to the tree's leaves. The UNIX file system is described as "tree-structured," with a single directory. All the files that can be reached by tracing a path down through the directory hierarchy from the root directory constitute the file system.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media, which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the inode structure. Each inode is addressed by an index contained in an i-list. The i-list is generated based on the size of the file system, with larger file systems generally implying more files and, thus, larger i-lists. Each inode contains thirteen 4-byte disk address elements. The direct inode can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct inode is required.

All input and output (I/O) is done by reading the writing files, because all peripheral devices, even terminals, are files in the file system. In a most general case, before reading and writing a file, it is necessary to inform the system of your intent to do so by opening the file. In order to write to a file, it may also be necessary to create it. When a file is opened or created (by way of the 'open' or 'create' system calls), the system checks for the right to do so and, if all is well, returns a non-negative integer called a file descriptor. Whenever I/O is to be done on this file, the file descriptor is used, instead of the name, to identify the file. This open file descriptor has associated with it a file table entry kept in the "process" space of the user who has opened the file. In UNIX terminology, the term "process" is used interchangeably with a program that is being executed. The file table entry contains information about an open file, including an inode pointer for the file and the file pointer for the file, which defines the current position to be read or written in the file. All information about an open file is maintained by the system.

In conventional UNIX, all input and output is done by two system calls, 'read' and 'write,' which are accessed from programs having functions of the same name. For both system calls, the first argument is a file descriptor. The second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remain to be read. A return value of zero implies end of file, a return value of −1 indicates an error of some sort. For writing, the value returned is the number of bytes actually written. An error has occurred if this is not equal to the number which was supposed to be written.

The parameters of the 'read' and 'write' system calls may be manipulated by the application program that is accessing the file. The application must, therefore, be sensitive to and take advantage of the multi-level store characteristics inherent in a standard system memory hierarchy. It is advantageous, from the application perspective, if the system memory components can be viewed as a single level hierarchy. If this is properly done, the application could dispense with most of the I/O overhead.

Faults are inevitable in digital computer systems due to such things as the complexity of the circuits and the associated electromechanical devices. To permit system operation, even after the occurrence of a fault, the art has developed a number of fault-tolerant designs. Improved fault-tolerant digital data processing systems include redundant functional units, e.g., duplicate CPUs, memories, and peripheral controllers interconnected along a common system bus. Each of a pair of functional units responds identically to input received from the bus. In the outputs, if a pair of functional units do not agree, that pair of units is taken off-line, and another pair of functional units (a "spare") continues to function in its place.

Even with the recent developments in fault-tolerant systems, there are characteristics of UNIX systems that make them difficult to adapt to conventional fault-tolerant operation. An important element of fault-tolerant systems is a maintenance and diagnostic system that automatically monitors the condition (or "state") of functional units of the data processing system, particularly those that are more readily replaceable ("field replaceable units," or FRUs). The complexity of UNIX based systems requires that such fault-tolerant systems maintenance and diagnostic systems (or "state machines") have capabilities far beyond anything conventionally available. Therefore, catastrophic failure of UNIX based systems may be expected at a somewhat higher frequency than other operating systems in which fault tolerance systems are easily adapted.

Catastrophic failure is defined as any hardware problem, including but not limited to disk, planar, or adapter anomalies, which cause information about data placement or user environment to be lost to the base operating system. It is also possible, though less likely, that such failure incidents can originate within software, due to defects in coding or method of execution.

Rebuilding UNIX images, in particular, requires awareness of many system parameters, including volume groups, logical volumes, filesystems, disk allocations, network interfaces, operational services, printer definitions, software revisions, hardware specifics, and other factors. Failure to maintain awareness of these parameters may result in an inability to rebuild a system following a catastrophic failure.

To elaborate, even though root or data backups may occur on a regular basis, this is frequently not enough. It is very important to be able to recreate not just the data and user identification, but also the physical to logical mappings across disks. Furthermore, reconstruction of volume groups and other data groupings must be accomplished throughout the environment of the crashed system. Finally, the ideal innovation would present such data to the administrator for manual reconstruction and would also provide input for another tool, which could then automatically recreate all such environmental parameters on the system following a catastrophic failure.

Typically, too little thought is given to complete disaster recovery, even in the most conscientious Information Systems (IS) shops. Typically, disparate system backups are made, usually of the root volume group, and perhaps of critical data. However, this leaves many gaps in system knowledge; and following hardware failures or serious software problems, a great deal of human intervention can be required to recreate volume groups, determine logical mappings, etc. before the system can return to a fully operational state.

In today's increasingly complex computer environment, with large disk array, shared data, and widespread user base, recreating a system environment following a catastrophic failure has become an ever more difficult task. Following a system failure, users typically restore portions of the system manually from tape (such as rootvg), recreate data structures (volume groups, logical volumes, and filesystems) by hand, and then restore data from applications manually. Furthermore, in the case of shared disk arrangements, replacement of disks into volume groups is a hit-or-miss proposition, where disks are imported into volume groups at random, such that the contents may be queried to discover the true, original arrangement.

It would be advantageous to provide system administrators with a tool to accurately recreate data structures, such as volume groups, logical volumes, and filesystems. Finally, it would further be advantageous to provide system administrators with a tool to replace disks with volume groups, without random importation, by providing contents that may be queried to discover the true original arrangement of the data. It would be even more advantageous to provide system administrators with a tool for reconstructing an entire system by allowing for the creation of a system configuration image which defines all system parameters and by then using the image or configuration parameter to automatically reconstruct the system.

SUMMARY OF THE INVENTION

The present invention relates to a system and method for acquiring valid system configuration for rebuilding UNIX images. In particular, the present invention always for the outputting of critical system parameters including volume groups, logical volumes, filesystems, disk allocations, network interfaces, operational services, printer definitions, software revisions, hardware specifics, and other factors. Initially, a configuration script is stored, either remotely or locally on a system. The configuration script is executed based on a set of predefined execution parameters, such as time based parameters, system usage, or loading parameters, or even based on the types of operation being performed on the system.

Once executed, the configuration script outputs a series of current configuration parameters to a safe storage area. These current configuration parameters define the system in terms of system hardware specifics, software specifics, and firmware specifics, including mappings from logical to physical disk drives. By recording such detailed information in a methodical form and preserving it in an accessible state, a script may be written to place every logical volume, every filesystem, and every block of data back onto its disk of origin, even if attached disk arrays stretch into terabytes. By detailing all relevant system parameters, output can be fed as input into a reconstruction script, which can then be written by anyone skilled in UNIX administration, provided the administrator has the comprehensive system environment description generated by the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart depicting a process for using the configuration parameters obtained in the process depicted in FIG. 5, for reconstructing a system configuration image file on a system which has failed.

DETAILED DESCRIPTION OF THE PREFERRED EMBODIMENT

Figure 1:
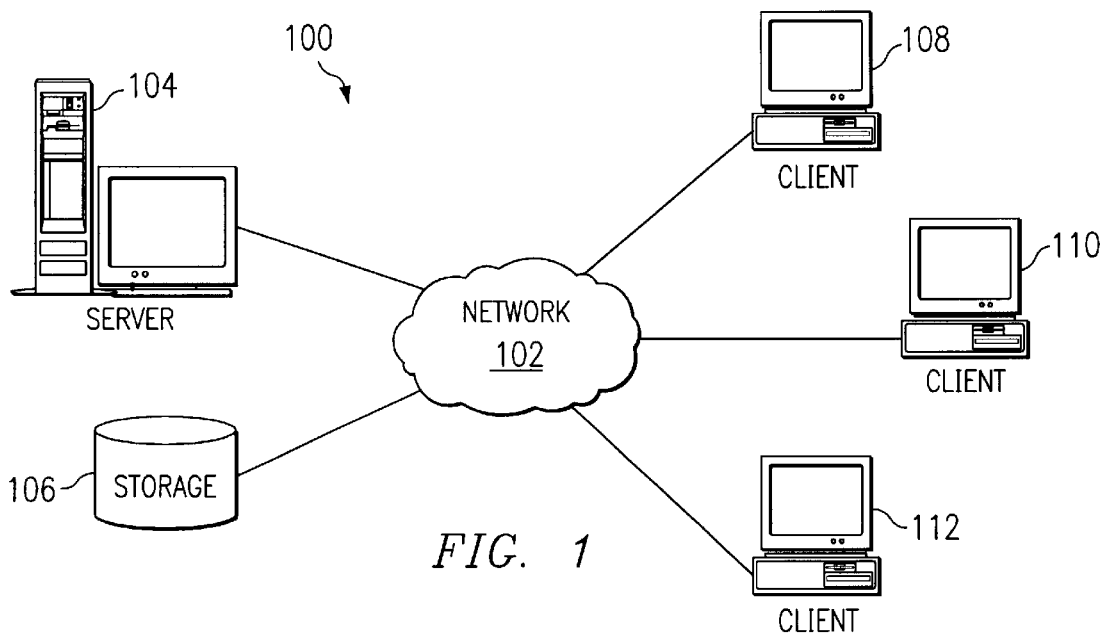
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
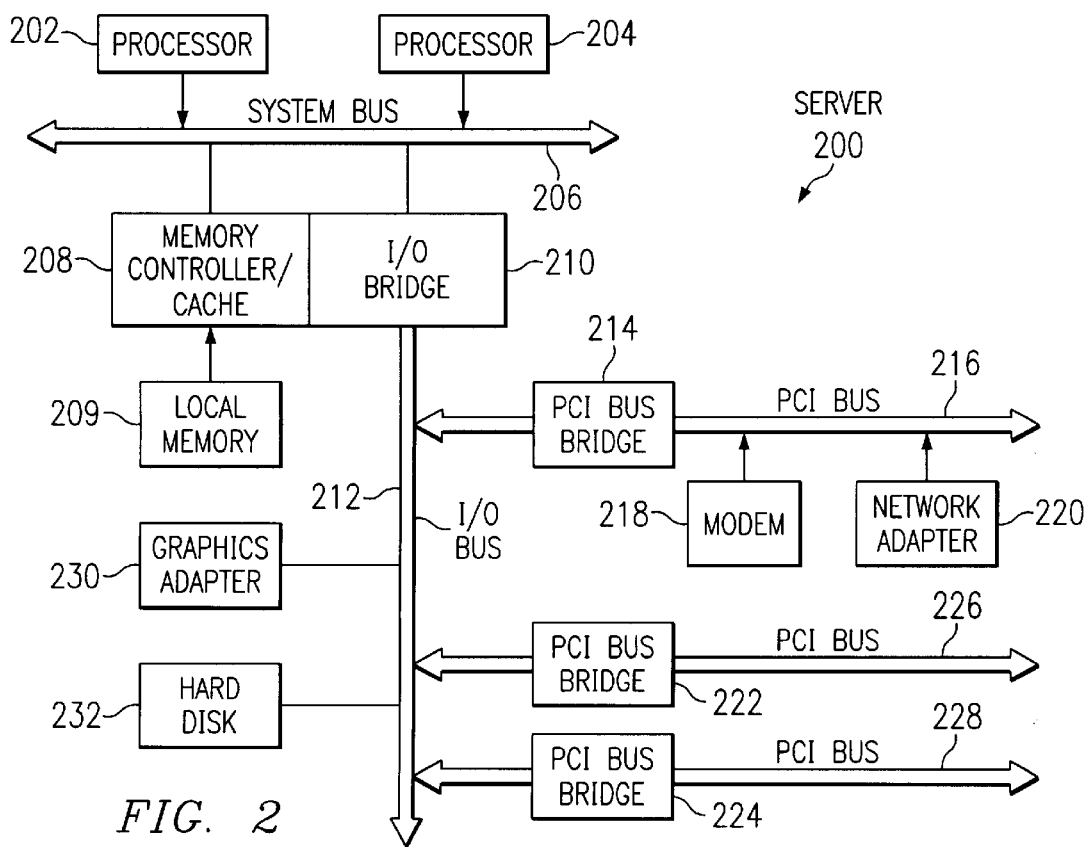
FIG. 2 is a block diagram depicting a data processing system which may be implemented as a server in accordance with a preferred embodiment of the present invention.

Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
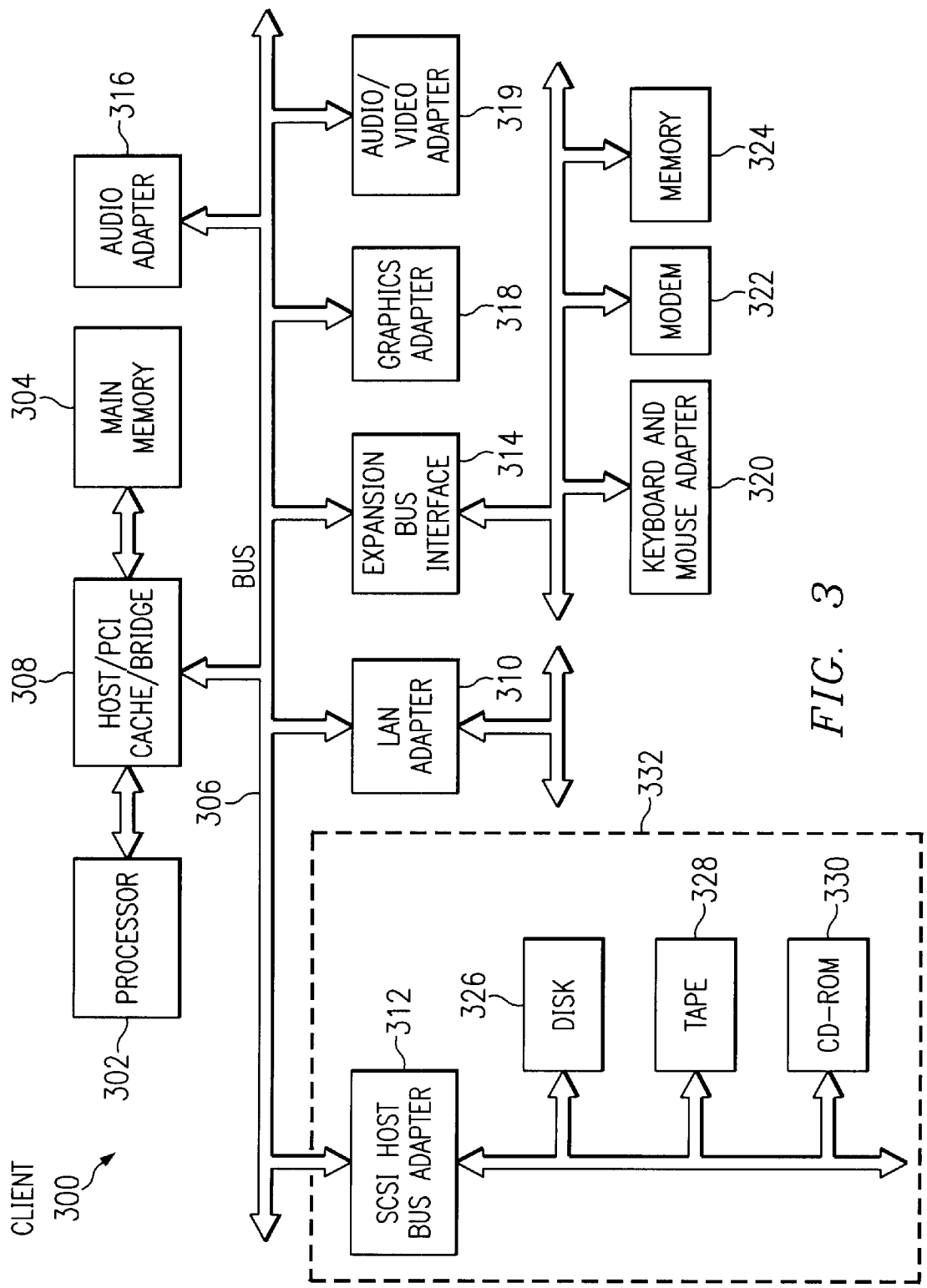
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300.

"Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3, as well as above-described examples, are not meant to imply architectural limitations.

The present invention solves the problems associated with the prior art. In a preferred embodiment, a comprehensive script is painstakingly constructed to record virtually every facet of a system's configuration, including hardware, software, and firmware specifics. These system configuration parameters are kept current by invoking the script based on script execution parameters. The output of this script is stored both locally and remotely (hard or soft copy) for use in the event of catastrophic failure. The innovation of such script usage and its corresponding output, which can easily exceed 50 pages of configuration details, is an invaluable aide in rebuilding a system.

An alternative embodiment of the present invention further advances this art and its output by enabling automatic recreation of an entire system environment. By detailing all relevant system parameters, output can be fed as input into a reconstruction script, which can then be written by anyone skilled in UNIX administration, provided the administrator has the comprehensive system environment description generated by the present invention.

A preferred embodiment of the present invention can provide the critical key in recovery from large system problems. One example is the reconstruction of SSA (serial storage disk arrays) after loss of volume group information due to an adapter failure. Using the output of the present invention, manual reconstruction of logical to physical disk mappings is possible.

Furthermore, a preferred embodiment of the present invention enables the next step in disaster recovery evolution—complete automation of the disaster recovery process. By recording such detailed information in a methodical form and preserving it in an accessible state, a script may be written to place every logical volume, every filesystem, and every block of data back onto its disk of origin, even if the disk arrays stretch into terabytes. The present invention provides a higher level of system integrity to clients by creating the building blocks needed to advance from manual restoration to automatic restoration.

When provided with a wide-ranging picture of a system's configuration, an administrator has the ability to reconstruct the system following a catastrophic failure. Furthermore, the present invention allows automated tools for rebuilding a system when executed within a preferred embodiment. A preferred embodiment of the present invention provides an administrator with a trail to follow, ensuring that all components may be reconstructed to their original form. More importantly, the present innovation permits full automation of the restoration process.

Figure 4:
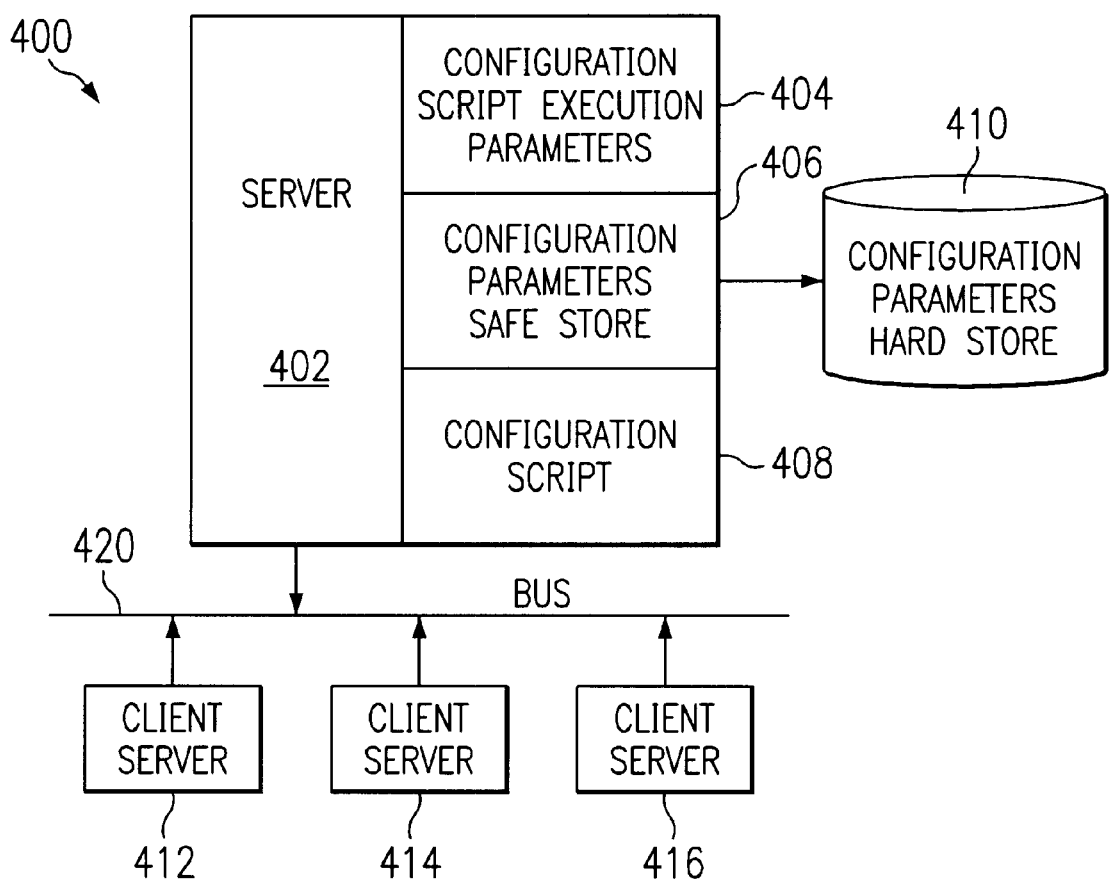
FIG. 4 illustrates a network in which a preferred embodiment of the present catastrophic recovery aide system has been implemented.

FIG. 4 illustrates a network in which a preferred embodiment of the present catastrophic recovery aide system has been implemented. Network 400 consists of server 402 and a series of client servers 412, 414 and 416, connected through bus 420. Each of servers 412-416 uses a UNIX operating system, such as AIX. Servers 402, 412, 414 and 416 may be any one of the commercially available server systems, such as the RS/6000 system. Server 402 contains the catastrophic recovery aide system in the form of system configuration parameter script 408. In a preferred embodiment of the present invention, configuration script 408 is executed on server 402, or instead may be remotely executed on any of client servers 412–416, in order to retrieve configuration parameters for each of the systems. Configuration script 408 lists all configuration parameters associated with the system in which it is executed. These parameters may include hardware, software, and firmware parameters, recovering such parametric information as volume groups, logical volumes, filesystems, disk allocations, network interfaces, operational services, printer definitions, software revisions, hardware specifics, and a myriad of other factors used in constructing a server system image for defining servers such as 402, 412, 414 and 416. Alternatively, configuration script 408 may be executed only on server 402, causing server 402 to request the parametric information from each of client servers 412, 414 and 416.

Once the requested configuration parameters have been listed by a server, the information must be stored in a safe store, such as configuration parameter safe store 406. Clearly, the optimum fashion in which to store configuration parameters would be on a hard store, such as an external disk or drive, such as configuration parameters hard store 410. Alternatively and/or simultaneously, a hard copy of the configuration parameters may be listed in tabular form for the administrator.

An important feature of the present invention is that configuration script 408 maintains a current list of all configuration parameters for each client server in which it is designated to be executed. Therefore, server 402 also contains a configuration script execution parameters section 404, wherein an administrator designates servers on which to run the configuration script, and sets script execution parameters defining a method for invoking configuration script 408.

Normally, script 408 would be executed on a designated server at a specific time interval. However, merely executing a script in a temporal fashion may overlook important or crucial system configuration parameters that have been changed or updated due to new hardware, software, software states, or firmware. In an alternative embodiment of the present invention, configuration script execution parameters 404 includes a method for monitoring system usage or load as a method for gauging the likelihood of system parameter changes. Thus, configuration script 408 may be executed prior to an appointed execution time due to the load handled by a server.

Figure 5:
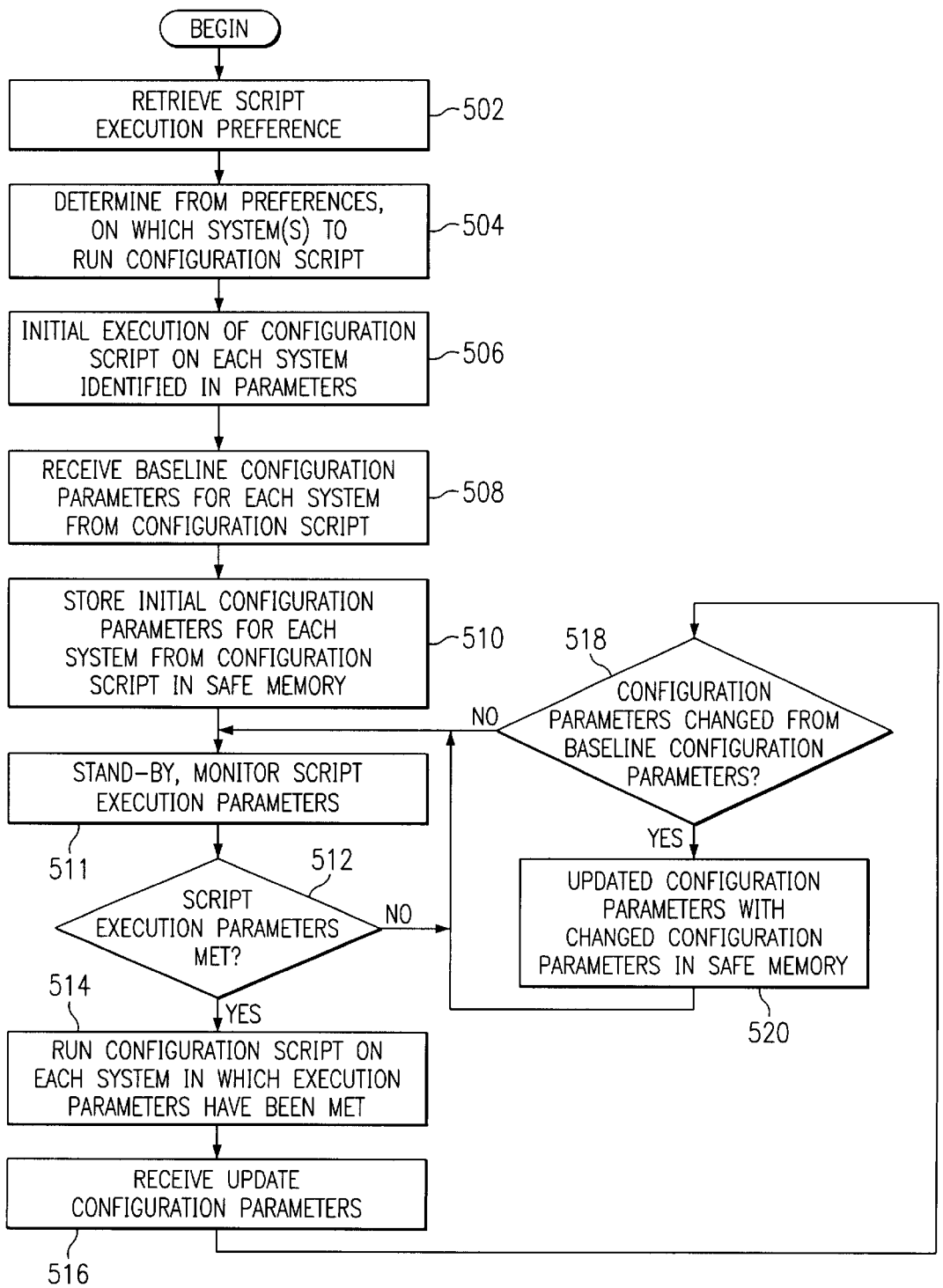
FIG. 5 is a flowchart depicting the process by which the configuration script may be executed in a network.

FIG. 5 is a flowchart depicting the process by which script 408 may be executed in a network. The process begins with a server retrieving script execution preferences (step 502). These preferences may relate to only the local server or may relate to a plurality of remote servers. A determination is made from the preferences which systems on which to run the configuration script (step 504). Once the script execution parameters have been loaded and a determination has been made as to which systems on which the configuration script is to be executed, the configuration script is initially run on each of the designated servers (step 506). From the initial execution of the configuration script, baseline configuration parameters for each system are retrieved (step 508).

Importantly, because all system configuration parameters are unknown prior to the baseline execution of the configuration script, the initial execution of the configuration script is expected to be the most time consuming execution. From the baseline running of the configuration script, the initial configuration parameters for each system are stored in a safe memory (step 510). This safe memory may be an external hard disk or hard copy, or, alternatively, it may be simultaneously written to multiple locations.

Once the baseline configuration parameters are set for each system, the configuration script is set in a standby state, monitoring the script execution parameters (step 511). Although the process of the present invention could be implemented in such a way as to have each server automatically identify changes in its configuration and send those changes to a safe memory, such a process would be unduly burdensome on the systems, as an extra resident layer would effectively be added to the operating system. Thus, the capacity of those systems would be slightly reduced.

Returning to step 511, a determination is made as to whether any script execution parameter has been met which would execute the configuration script (step 512). Again, these parameters may be time-based, system load-based, based on specifically identified system operations, or some other factor which could be related to a configuration change of the server. If no script execution parameter has been met, causing the execution of the configuration script, the server maintains the standby mode, monitoring script execution parameters (step 511). If, on the other hand, the server determines that a script execution parameter has been met, the configuration script is run on each system in which the execution parameters for that system have been met (step 514). The system then receives updated configuration parameters for each of those systems (step 516).

Next, a determination is made as to whether the configuration parameters have changed from the baseline configuration parameters (step 518). This feature of the process may be implemented in a number of different fashions, including maintaining a ready list of baseline configuration parameters and comparing the updated configuration parameters with the ready list of baseline parameters. Alternatively, once a server has responded to the script with updated configuration parameters, the script executing server may call for the baseline configuration parameters, make a comparison, and then update the baseline parameters with only those configuration parameters which are determined to have been changed.

Another important aspect of comparing updated configuration parameters with those configuration parameters pre- viously restored, is that invalid configuration parameters may be detected early in the comparison operation, and the administrator may be alerted prior to any invalid configuration parameters being saved and relied upon. Finally, the executing server may merely write over each set of configuration parameters each time the script has been executed. However, merely overwriting configuration parameters at each execution of the script may pose a problem in that, if invalid data has been recovered from a system or subsystem which has failed or is in the process of failing, the configuration parameters may be invalid, reducing the likelihood that a system image can be reconstructed from the configuration parameters. Therefore, if the entire list of configuration parameters is to be saved at each execution, then at least one other list of configuration parameters must also be saved as a safety copy in the event of invalid configuration parameters in the most recent script execution.

Returning to decision step 518, if the determination is made that the configuration parameters have not changed, the process flows back to step 511 and reverts to standby mode. If, on the other hand, as alluded to above, it is determined that the configuration parameters have changed from the previous execution, then the configuration parameters are updated in a safe memory with only the changed configuration parameters (step 520). The process again returns to step 511, where the system reverts to the standby mode, monitoring the script execution parameters.

FIG. 6 is a flowchart depicting a process for using the configuration parameters obtained in the process depicted in FIG. 5, for reconstructing a system configuration image file on a system which has failed. The process begins with a detection of a catastrophic failure of a system (step 602). An important feature of the present invention is that, unlike prior art systems, this method allows for the full recovery of a system downed by a catastrophic failure. However, the present process is also useful for creating system configuration image files on systems in which a less than catastrophic failure has occurred.

At some point, the failed system components are identified (step 604). Another important aspect of the present invention is that the system configuration parameters may be used either as guidelines for the administrator to manually reconstruct a system image, or to automatically create an image file with little or no administrator intervention. Therefore, a decision must be made as to whether manual recovery is desired (step 606). The present invention allows for the entry of system configuration parameters into a reconstruction script which automatically reconstructs the system or reconstructs the system with minimum operator intervention.

If no manual recovery is desired, a determination is made as to whether a partial system configuration image file exists (step 608). While a preferred embodiment of the present invention allows for reconstruction of a system image file in the event of even the most disastrous system failure, the configuration parameters stored in response to execution of the configuration script are also useful in reconstructing parts of systems or subsystems which have failed. If it is determined that a partial system configuration image is available, that image may be used as a template (step 610). This template may be modified by retrieving the updated parameters for the failed system from the safe memory (step 612). A complete system configuration image may then be reconstructed using the partial template and the updated configuration parameters for the failed components (step 614). The process then flows to step 626.

Returning to decision 608, if a true catastrophic failure has occurred on the system, no partial system configuration will exist, or the image will be suspected of having invalid data. In this case, the updated configuration parameters for the failed system are retrieved from safe memory (step 616). With the updated configuration parameters, a system configuration image is automatically rebuilt entirely from the updated configuration parameters (step 618). The process then flows to step 626.

Returning to step 606, if manual recovery rather than automatic recovery of the system configuration image is desired, the system administrator is notified of the failure and the identity (as can best be determined) of the failed components (step 620). The updated system configuration parameters for the failed system are then retrieved from safe memory and delivered to the administrator (step 622). The system administrator can then manually rebuild the system configuration image from the updated configuration parameters, paying careful attention to information related to failed components. The process then flows to step 626.

Once the system has been reconfigured and is back online, the configuration script must be once again executed on the failed system (step 626). While it is unlikely that configuration parameters have changed, it is possible that the administrator reconfigured certain system components, making the previous system configuration parameters invalid. Therefore, the configuration script must be executed, and new baseline configuration parameters for the failed systems are received and stored in safe memory (step 628). The process then ends.

Table A illustrates a typical configuration script to be run on a UNIX system, specifically the AIX operating system configured on the RS/6000 system. It would be inherent for one of ordinary skill in the art to modify the configuration script illustrated in Table A for other UNIX based operating system.

TABLE A

```
#!/bin/ksh
###########################################################################

#    store_config        Version 2.00
#                Runs various AIX commands to document RS/6000
#                  and AIX configuration.

#                  Assembled by Carl Gusler and Rick Hamilton
#                  IBM Global Services
#                  IBM Austin
#                    cgusler@us.ibm.com, rh@us.ibm.com

#                  (With help from many friends)

#                  Copyright IBM 1994, 1995, 1996, 1997, 1998
#                  Controlled Distribution
Protected under the procedures, processes, rights
#                    rules, regulations, and retributions of
#                    IBM Global Services
Intellectual Property Management

###########################################################################
#---------------------------------------------------------------------

#    Copyright Information:    Copyright IBM 1998
#            Controlled Distribution
Protected under the procedures, processes, rights
#            rules, and regulations of
#            IBM Global Services
Intellectual Property Management

#        This program is an IBM Type II Deliverable as
#            described in the IBM Customer Agreement and
#            relevant IBM services contracts.

#        IBM retains all rights to this program and does not
#            transfer any rights for replication or distribution
#            of this program except for the following:
#              1.   Backup/archivae copies taken as a normal
#                   course of system maintenance.
#              2.   Copying the program to a similar machine
#                   within the same enterprise.

#        The customer agrees to restrict access to this
#            program as they would their own proprietary code,
#            and to notify IBM should unauthorized distribution
#            occur.

#        This program is distributed on an "as is" basis,
#            no warranty is expressed or implied.

#---------------------------------------------------------------------
#---------------------------------------------------------------------

```

TABLE A-continued

```
#   Operational Environment:   Tested on various releases of AIX
#                              from AIX V3.2.0 through AIX V4.2.1

#   Comments:  store_config Version 2.0
#              Runs various AIX commands to gather system configuration
#              information into three text files. The text files are named
#              config.date, tty.config.date, and lp.config.date.
#              (File names contain date stamps.)
#              These files can be printed and/or store off-line for reference.

#---------------------------------------------------------------------
#---------------------------------------------------------------------

#   Version History:   None

#---------------------------------------------------------------------
#---------------------------------------------------------------------

#   Environmental Variables

#---------------------------------------------------------------------
SUFFIX=`date + "%m.%d.%y"`
FC=config.$SUFFIX
FT=tty.config.$SUFFIX
FP=lp.config.$SUFFIX
DIV='*RS/6000 CONFIGURATION SUMMARY*****************************'
HSTARS='**********HARDWARE CONFIGURATION*****************************'
SSTARS='**********SOFTWARE CONFIGURATION*****************************'
#---------------------------------------------------------------------

#   Usage Message: None

#---------------------------------------------------------------------
#---------------------------------------------------------------------

#   Main Routine

#---------------------------------------------------------------------

/usr/bin/echo  'Processing . . . Please Stand By.'
/usr/bin/echo  $DIV > $FC
/usr/bin/echo  " Current configuration information for " $1 $2 >> $FC
/usr/bin/echo  "    as of 'date' " >> $FC# Show date
/usr/bin/echo  "    Contents:     " >> $FC
/usr/bin/echo  "    Hardware Configuration" >> $FC
/usr/bin/echo  "       CPU Identification      Device Summary" >> $FC
/usr/bin/echo  "       Device Details      Network Interfaces >> $FC
/usr/bin/echo  "       Paging Spaces       File Systems" >> $FC
/usr/bin/echo  "       Volume Groups       Logical Volumes" >> $FC
/usr/bin/echo  "       Physical Volumes        Terminal Devices" >> $FC
/usr/bin/echo  "       Printer Devices  " >> $FC
/usr/bin/echo  "    Software Configuration" >> $FC
/usr/bin/echo  "       AIX Level Identification" >> $FC
/usr/bin/echo  "       Installed LPP Software Summary" >> $FC
/usr/bin/echo  "       AIX System Paramaters" >> $FC
/usr/bin/echo  "       AIX Network Paramaters  " >> $FC
/usr/bin/echo  $HSTARS >> $FC
# list system name and OS level
/usr/bin/echo  "---CPU Identification Information---" >> $FC
/usr/bin/echo  "[ uname -am ]  'uname -am' " >> $FC
BELIEF="Believed to be an RS/6000"
TYPE=$(uname -m | cut -c9-10)
case; $TYPE in
    "02") MODEL="Model 930" ;;
    "10") MODEL="Model 530 or 730" ;;
    "11") MODEL="Model 540" ;;
    "14") MODEL="Model 540" ;;
    "18") MODEL="Model 530H" ;;
    "1C") MODEL="Model 550" ;;
    "20") MODEL="Model 930" ;;
    "2E") MODEL="Model 950 or 950E" ;;
    "30") MODEL="Model 520 or 740 or 741" ;;
    "31") MODEL="Model 320" ;;
    "34") MODEL="Model 520H" ;;
    "35") MODEL="Model 320H" ;;
    "37") MODEL="Model 340" ;;
    "38") MODEL="Model 350" ;;
```

TABLE A-continued

```
            "41") MODEL="Model 220" ;;
            "42") MODEL="Model 41W or 41T" ;;
            "43") MODEL="Model M20" ;;
            "45") MODEL="Model 220" ;;
            "46") MODEL="Model 250 or other PowerPC Model" ;;
            "47") MODEL="Model 230" ;;
            "48") MODEL="Model C10" ;;
            "49") MODEL="Model 250 or other PowerPC Model" ;;
            "4D") MODEL="Model 40P or other PowerPC Model" ;;
            "57") MODEL="Model 390 or 3BT" ;;
            "58") MODEL="Model 380 or 3AT" ;;
            "59") MODEL="Model 3CT" ;;
            "5C") MODEL="Model 560" ;;
            "63") MODEL="Model 970 or 970B" ;;
            "64") MODEL="Model 980 or 980B" ;;
            "66") MODEL="Model 580 or 580F" ;;
            "67") MODEL="Model 570 or 770 or 771 or R10" ;;
            "70") MODEL="Model 590" ;;
            "71") MODEL="Model 580H" ;;
            "72") MODEL="Model 590H or R20" ;;
            "75") MODEL="Model 370 or 375 or 37T" ;;
            "76") MODEL="Model 360 or 36S or 36T" ;;
            "77") MODEL="Model 340H or 350 or 355 or 550H or 550L" ;;
            "79") MODEL="Model 591 or R21" ;;
            "80") MODEL="Model 990" ;;
            "81") MODEL="Model R24" ;;
            "82") MODEL="Model R24" ;;
            "90") MODEL="Model C20" ;;
            "91") MODEL="Model 42W or 42T" ;;
            "A0") MODEL="Model J30 or R30" ;;
            "A6") MODEL="Model G30" ;;
            "C0") MODEL="Model E20" ;;
            "C4") MODEL="Model F30" ;;
            "F0") MODEL="Model N40" ;;
            *) MODEL="of undetermined model (or SP node.)"
esac
/usr/bin/echo $BELIEF $MODEL >> $FC
/usr/bin/echo " ---Summary Device Information---" >> $FC
/usr/bin/echo "[ lsdev -C ]  'lsdev -C | sort' " >> $FC
# list configuration information
/usr/bin/echo "---Detailed Devices Information---" >> $FC
/usr/bin/echo "[ lscfg -v ] " >> $FC
/usr/sbin/lscfg -v >> $FC
# list network interface information
/usr/bin/echo "---Network Interface Information---" >> $FC
if [[ -a /dev/tok0 ]]
then
      /usr/bin/echo "[ ifconfig tr0 ]   'ifconfig tr0' " >> $FC
fi
if [[ -a /dev/tok1 ]]
then
      /usr/bin/echo "[ ifconfig tr1 ]   'ifconfig tr1' " >> $FC
fi
if [[ -a /dev/tok2 ]]
then
      /usr/bin/echo "[ ifconfig tr2 ]   'ifconfig tr2' " >> $FC
fi
if [[ -a /dev/ent0 ]]
then
      /usr/bin/echo "[ ifconfig en0 ]   'ifconfig en0' " >> $FC
      /usr/bin/echo "[ ifconfig et0 ]   'ifconfig et0' " >> $FC
fi
if [[ -a /dev/ent1 ]]
then
      /usr/bin/echo "[ ifconfig en1 ]   'ifconfig en1' " >> $FC
      /usr/bin/echo "[ ifconfig et1 ]   'ifconfig et1' " >> $FC
fi
if [[ -a /dev/ent2 ]]
then
      /usr/bin/echo "[ ifconfig en2 ]   'ifconfig en2' " >> $FC
      /usr/bin/echo "[ ifconfig et2 ]   'ifconfig et2' " >> $FC
fi
# list boot disk information
/usr/bin/echo "---Boot Disk Infomation---" >> $FC
/usr/bin/echo "[ bootinfo -b ]  'bootinfo -b' " >> $FC
# list paging space information
/usr/bin/echo "---Paging Spaces Information---" >> $FC
/usr/bin/echo " lsps -a ]   'lsps -a' " >> $FC
# list file system information
```

TABLE A-continued

```
/usr/bin/echo "---File Systems Information---" >> $FC
# list file system
/usr/bin/echo "[ lsfs ]   'lsfs' " >> $FC
# list mounted file systems
/usr/bin/echo "[ mount ]   'mount' " >> $FC
# list Logical Volume information
/usr/bin/echo "---Logical Volume Information---" >> $FC
# list logical volume summary info
/usr/bin/echo "[ lsvg –o | lsvg –i –1 ]   'lsvg –o | lsvg –i –1' " >> $FC
# list logical volume detailed information
for LV in $(lsdev –Cc logical_volume | grep –v "Volume group" | cut –f 1 –d " "
| sort)
do
/usr/bin/echo "[ lslv $LV ]   'lslv $LV' " >> $FC
/usr/bin/echo "[ lslv –1 $LV ]   'lslv –1 $LV' " >> $FC
done
# list Physical Volume information
/usr/bin/echo "---Physical Volume Information---" >> $FC
# list physical volumes
/usr/bin/echo "[ lspv ]   1spv " >> $FC
# list Physical Volume summary info
/usr/bin/echo "[ lsvg –o | lsvg –i –p ]   'lsvg –o | lsvg –i –p'" >> $FC
# list Physical Volume Detailed info
for PV in $(lsdev –Cc disk –F "name")
do
/usr/bin/echo "[ lspv $PV ]   'lspv $PV' " >> $FC
/usr/bin/echo "[ lspv –1 $PV ]   'lspv –1 $PV' " >> $FC
/usr/bin/echo "[ lspv –p $PV ]   'lspv –p $PV' " >> $FC
done
# list Terminal Device information
/usr/bin/echo "---Terminal Devices Summary Information---" >> $FC
# list Terminal Device summary info
/usr/bin/echo "[ lsdev –Cc tty ]   'lsdev –Cc tty' " >> $FC
# List Detailed info on tty0, tty1
/usr/bin/echo "---Terminal Devices Detailed Information---" >> $FC
/usr/bin/echo "   WARNING:" >> $FC
/usr/bin/echo "   Detailed Information provided only for tty0!" >> $FC
/usr/bin/echo "   Detailed Information for all ttys stored in" $FT " " >> $FC
if [[ –a /dev/tty0 ]]
then
/usr/bin/echo '[ lsattr –F "description attribute value" –1 tty0 ]   ' >> $FC
/usr/sbin/lsattr –F "description attribute value" –1 tty0 >> $FC
fi
/usr/bin/echo "Documenting ttys . . . Please Stand By"
/usr/bin/echo $DIV > $FT
/usr/bin/echo " Current tty configuration information for " $1 $2 >> $FT
/usr/bin/echo "   as of 'date' " >> $FT# Show date
for TTY in $(lsdev –Cc tty –F "name")
do
/usr/bin/echo ' [ lsattr –F "description attribute value" –1' $TTY '] ' >> $FT
/usr/sbin/lsattr –F "description attribute value" –1 $TTY >> $FT
done
# list Printer Device infomation
/usr/bin/echo "   ---Printer Devices Summary Infomation---" >> $FC
# list Printer Device summary info
/usr/bin/echo "[ lsdev –Cc printer ]   'lsdev –Cc printer' " >> $FC
# List Detailed info on lp0, lp1
/usr/bin/echo "---Printer Devices Detailed Infomation---" >> $FC
/usr/bin/echo "   WARNING:" >> $FC
/usr/bin/echo "   Detailed Infomation provided only for lp0!" >> $FC
/usr/bin/echo "   Detailed Infomation for all lps stored in" $FP " " >> $FC
if [[ –a /dev/lp0 ]]
then
     /usr/bin/echo "[ lsattr –F –1 lp0 ]   " >> $FC
     /usr/sbin/lsattr –F "description attribute value" –1 lp0 >> $FC
fi
/usr/bin/echo "Documenting lps . . . Please Stand By"
/usr/bin/echo $DIV > $FP
/usr/bin/echo "Current lp configuration information for " $1 $2 >> $FP
/usr/bin/echo "   as of 'date' " >> $FP# Show date
for LP in $(lsdev –Cc printer –F "name")
do
/usr/bin/echo ' [ lsattr –F "description attribute value" –1' $LP '] ' >> $FP
/usr/sbin/lsattr –F "description attribute value" –1 $LP >> $FP
done
/usr/bin/echo $SSTARS >> $FC
/usr/bin/echo "---AIX Level Infomation---" >> $FC
if [[ –f /usr/bin/oslevel ]]
then
```

TABLE A-continued

```
        /usr/bin/echo " [ oslevel ]  'oslevel' " >> $FC
else
        /usr/bin/echo " AIX is installed at level previous to AIX V3.2.4 " >> $FC
fi
# list license program products
/usr/bin/echo "---Installed LPP Software Summary Information---" >> $FC
/usr/bin/echo 'Processing software . . . Please Stand By.'
if [[ -f /usr/bin/oslevel ]]
then
        /usr/bin/echo "[ lslpp -L all ] " >> $FC
        lslpp -L all >> $FC
else
        /usr/bin/echo "[ lslpp -1 ]  'lslpp -1' " >> $FC
fi
# list system parameters
/usr/bin/echo "  ---AIX System Paramaters Infomation---" >> $FC
/usr/bin/echo "[ lsattr -EH1 sys0 ]  'lsattr -EH1 sys0' " >> $FC
# list network parameters
/usr/bin/echo "  ---AIX Network Paramaters Infomation---" >> $FC
/usr/bin/echo "[ no -a ]  $(no -a) " >> $FC
```

Table B illustrates examples of configuration parameters which might be expected in response to running the configuration script shown in Table A. Table B are exemplary illustrations of some detailed device configuration parameters obtained in executing the configuration script. Note that configuration parameters "ROS level and ID" show microcode level installed on these disks.

TABLE B

```
---Detailed Devices Information---
[ lscfg -v ]
INSTALLED RESOURCE LIST WITH VPD
The following resources are installed on your machine.
        Model Architecture: RS6K
        Model Implementation: Multiple Processor, MCA bus
cabinet0           00-00                Cabinet
op_panel0          00-00                Operator Panel
        EC Level                        E59327
        FRU Number                      OPP
        Device Specific (MN)            1964747
        Part Number                     94H9986
        ROS Level and ID                1149G2901
        Serial Number                   0000000000006535
        Device Specific (Y0)            0000     00056215    7013J40    56215
mcaplanar0         00-00                MCA Planar
        EC Level                        E80794
        FRU Number                      PMA
        Device Specific (MN)            IBM97N
        Processor Component ID          000103080001000900010109000102090000104
                                        0900010509000106090001
        Part Number                     95H0009
        Serial Number                   17EA07702W
        Device Specific (Y0)            0000     00056215    7013J40    56215
sif0               00-00                Power Supply Interface
        EC Level                        E38084
        FRU Number                      SIF
        Device Specific (MN)            IBM97N
        Part Number                     35H8704
        ROS Level and ID                1149G2901
        Serial Number                   179U08000V
        Machine Type and Model          0000
        Device Specific (Y4)            00056215    7013J40    56215
        pdisk4     00-04-P              4GB SSA C Physical Disk Drive
        Manufacturer                    IBM
        Machine Type and Model          DFHCC4B1
        Part Number                     88G6401
        ROS Level and ID                8877
        Serial Number                   68E35068
        EC Level                        486509
        Device Specific (Z2)            RAMST077
        Device Specific (Z3)            88G6401
        Device Specific (Z4)            96261
        pdisks     00-04-P              9.1GB SSA C Physical Disk Drive
        Manufacturer                    IBM
        Machine Type and Model          DCHC09B1
        Part Number                     89H4940
```

TABLE B-continued

|  |  |
|---|---|
| ROS Level and ID | 9393 |
| Serial Number | 6804E440 |
| EC Level | 488611 |
| Device Specific (Z2) | RAMSC093 |
| Device Specific (Z3) | 89H4940 |
| Device Specific (Z4) | 97111 |

---Volume Group Information---
[ lsvg ]
rootvg
miscvg
oravg
tlgyg
appvg
ssatest
[ lsvg -o | lsvg -i ]

| | | | |
|---|---|---|---|
| VOLUME GROUP: | ssatest | VG IDENTIFIER: | 00056215eecc6015 |
| VG STATE: | active | PP SIZE: | 256 megabyte(s) |
| VG PERMISSION: | read/write | TOTAL PPs: | 197 (50432 megabytes) |
| MAX LVs: | 256 | FREE PPs: | 196 (50176 megabytes) |
| LVs: | 1 | USED PPs: | 1 (256 megabytes) |
| OPEN LVs: | 0 | QUORUM: | 4 |
| TOTAL PVs: | 7 | VG DESCRIPTORS: | 7 |
| STALE PVs: | 0 | STALE PPs | 0 |
| ACTIVE PVs: | 7 | AUTO ON: | yes |
| VOLUME GROUP: | appvg | VG IDENTIFIER: | 00056215337a9525 |
| VG STATE: | active | PP SIZE: | 64 megabyte(s) |
| VG PERMISSION: | read/write | TOTAL PPs: | 134 (8576 megabytes) |
| MAX LVs: | 256 | FREE PPs: | 84 (5376 megabytes) |
| LVs: | 3 | USED PPs: | 50 (3200 megabytes) |
| OPEN LVs: | 3 | QUORUM: | 1 |
| TOTAL PVs: | 2 | VG DESCRIPTORS: | 3 |
| STALE PVs: | 0 | STALE PPs | 0 |
| ACTIVE PVs: | 2 | AUTO ON: | yes |
| VOLUME GROUP: | tlgvg | VG IDENTIFIER: | 00056215346859c9 |
| VG STATE: | active | PP SIZE: | 64 megabyte(s) |
| VG PERMISSION: | read/write | TOTAL PPs: | 540 (34560 megabytes) |
| MAX LVs: | 256 | FREE PPs: | 338 (21632 megabytes) |
| LVs: | 5 | USED PPs: | 202 (12928 megabytes) |
| OPEN LVs: | 5 | QUORUM: | 1 |
| TOTAL PVs: | 4 | VG DESCRIPTORS: | 4 |
| STALE PVs: | 0 | STALE PPs | 0 |
| ACTIVE PVs: | 4 | AUTO ON: | yes |
| VOLUME GROUP: | oravg | VG IDENTIFIER: | 0005621534693849 |
| VG STATE: | active | PP SIZE: | 64 megabyte(s) |
| VG PERMISSION: | read/write | TOTAL PPs: | 945 (60480 megabytes) |

[ lspv hdisk1 ]

| | | | |
|---|---|---|---|
| PHYSICAL VOLUME: | hdisk1 | VOLUME GROUP: | rootvg |
| PV IDENTIFIER: | 00056215ec173f11 | VG IDENTIFIER | 00056215a3606e9c |
| PV STATE: | active | | |
| STALE PARTITIONS: | 0 | ALLOCATABLE: | yes |
| PP SIZE: | 8 megabyte(s) | LOGICAL VOLUMES: | 9 |
| TOTAL PPs: | 268 (2144 megabytes) | VG DESCRIPTORS: | 1 |
| FREE PPs: | 79 (632 megabytes) | | |
| USED PPs: | 189 (1512 megabytes) | | |
| FREE DISTRIBUTION: | 34..00..00..00..45 | | |
| USED DISTRIBUTION: | 20..54..53..53..09 | | |

[ lspv -1 hdisk1 ]
hdisk1:

| LV NAME | LPs | PPs | DISTRRBUTION | MOUNT POINT |
|---|---|---|---|---|
| hd5 | 1 | 1 | 01..00..00..00..00 | N/A |
| hd7x | 8 | 8 | 08..00..00..00..00 | N/A |
| hd4 | 2 | 2 | 01..00..01..00..00 | / |
| hd3 | 11 | 11 | 03..06..02..00..00 | /tmp |
| hd9var | 7 | 7 | 07..00..00..00..00 | /var |
| hd6 | 48 | 48 | 00..48..00..00..00 | N/A |
| hd8 | 1 | 1 | 00..00..01..00..00 | N/A |
| hd1 | 1 | 1 | 00..00..01..00..00 | /home |
| hd2 | 110 | 110 | 00..00..48..53..09 | /usr |

[ lspv -p hdisk1 ]
hdisk1:

| PP RANGE | STATE | REGION | LV NAME | TYPE | MOUNT POINT |
|---|---|---|---|---|---|
| 1–1 | used | outer edge | hd5 | boot | N/A |
| 2–9 | used | outer edge | hd7x | sysdump | N/A |
| 10–43 | free | outer edge | | | |
| 44–44 | used | outer edge | hd4 | jfs | / |
| 45–47 | used | outer edge | hd3 | jfs | /tmp |
| 48–54 | used | outer edge | hd9var | jfs | /var |
| 55–102 | used | outer middle | hd6 | paging | N/A |
| 103–108 | used | outer middle | hd3 | jfs | /tmp |

TABLE B-continued

| | | | | | |
|---|---|---|---|---|---|
| 109–109 | used | center | hd8 | jfslog | N/A |
| 110–110 | used | center | hd4 | jfs | / |
| 111–111 | used | center | hd1 | jfs | /home |
| 112–113 | used | center | hd3 | jfs | /tmp |
| 114–161 | used | center | hd2 | jfs | /usr |
| 162–214 | used | inner middle | hd2 | jfs | /usr |
| 215–223 | used | inner edge | hd2 | jfs | /usr |
| 224–268 | free | inner edge | | | |

********SOFTWARE CONFIGURATION**************************************

---AIX Level Information---
[ oslevel ]
4.2.1.0
---Installed LPP Software Summary Information---
[lslpp -L all ]

| Fileset | Level | State | Description |
|---|---|---|---|
| Atape.driver | 3.1.0.7 | C | IBM AIX Enhanced Tape and Medium Changer Device Driver |
| OpenGL.info.en_US.GL32 | 4.2.1.0 | C | AIXWindows/3D GL, Programming - U.S. English |
| OpenGL.info.en_US.OpenGL_X | 4.2.1.0 | C | AIXWindows/3D OpenGL Programming - U.S. English |
| X11.Dt.ToolTalk | 4.2.1.0 | C | AIX CDE ToolTalk Support |
| X11.Dt.bitmaps | 4.2.0.1 | C | AIX CDE Bitmaps |
| X11.Dt.helpinfo | 4.2.1.0 | C | AIX CDE Help Files and Volumes |
| X11.Dt.helpmin | 4.2.1.0 | C | AIX CDE Minimum Help Files |
| X11.Dt.helprun | 4.2.1.1 | C | AIX CDE Runtime Help |
| X11.Dt.lib | 4.2.1.9 | C | AIX CDE Runtime Libraries |
| X11.Dt.rte | 4.2.1.14 | C | AIX Common Desktop Environment (CDE) 1.0 |
| X11.adt.bitmaps | 4.2.0.0 | C | AIXwindows Application Developtnent Toolkit Bitmap Files |
| X11.adt.ext | 4.2.1.1 | A | AIXwindows Application Development Toolkit for X Extensions |
| X11.adt.imake | 4.2.1.1 | C | AIXwindows Application Development Toolkit imake |
| X11.adt.include | 4.2.1.1 | C | AIXwindows Application Developtment Toolkit Include Files |
| X11.adt.lib | 4.2.1.0 | C | AIXwindows Application Development Toolkit Libraries |
| X11.adt.motif | 4.2.1.0 | C | AIXwindows Application Development Toolkit Motif |
| X11.apps.aixterm | 4.2.1.2 | A | AIXwindows aixterm Application |
| X11.apps.clients | 4.2.1.1 | C | AIXwindows Client Applications |
| X11.apps.config | 4.2.1.0 | C | AIXwindows Configuration Applications |
| X11.apps.custom | 4.2.1.0 | C | AIXwindows Customizing Tool |
| X11.apps.msmit | 4.2.1.2 | C | AIXwindows msmit Application |
| X11.apps.rte | 4.2.1.1 | C | AIXwindows Runtime Configuration Applications |
| X11.apps.util | 4.2.0.0 | C | AIXwindows Utility Applications |
| X11.apps.xterm | 4.2.1.2 | A | AIXwindows xterm Application |
| X11.base.common | 4.2.0.0 | C | AIXwindows Runtime Common |

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a data processing system for implementing catastrophic recovery aid to a system, comprising:

executing a configuration parameter listing script;

receiving a configuration parameter list in response to executing the script, said list including environmental settings that define an operating environment for said system, said environmental settings including hardware specific settings and software specific settings, said hardware and software settings being necessary to reconstruct said entire operating environment;

storing the configuration parameter list;
accessing the configuration parameter list; and
constructing a configuration image file for said system using the configuration parameter list.

2. The method recited in claim 1, wherein the step of executing a configuration parameter listing script is performed locally.

3. The method recited in claim 1, wherein the step of executing a configuration parameter listing script is performed remotely.

4. The method recited in claim 1, wherein the step of executing a configuration parameter listing script is performed on a UNIX operating system.

5. The method recited in claim 1, wherein the step of storing the configuration parameter list further comprises accessing a remote memory.

6. The method recited in claim 1, wherein the step of storing the configuration parameter list further comprises writing the configuration parameter list to hard copy.

7. The method recited in claim 1, wherein the step of constructing a configuration image file for a system is a manual operation.

8. The method recited in claim 1, wherein the step of constructing a configuration image file for a system further comprises executing a reconstruction script that utilizes the configuration parameter list.

9. The method recited in claim 1, wherein the step of executing is performed based on time.

10. The method recited in claim 1, wherein the step of executing is performed based on execution parameters.

11. A method in a data processing system for implementing catastrophic recovery aid to a system, comprising:
   executing a configuration parameter listing script;
   receiving a baseline list of configuration parameters in response to executing the script, said configuration parameters being environmental settings that define an operating environment for said system, said environmental settings including hardware specific settings and software specific settings, said hardware and software settings being necessary to reconstruct said entire operating environment;
   re-executing the configuration parameter listing script;
   receiving an updated list of configuration parameters in response to executing the script;
   comparing the updated list of configuration to the baseline list of configuration parameters; and
   modifying the baseline list of configuration parameters to include configuration parameters on the basis of comparing.

12. A method in a data processing system for implementing catastrophic recovery aid to a system, comprising:
   receiving a request for a configuration parameter listing;
   determining system configuration parameters, said system configuration parameters being environmental settings that define an operating environment for said system, said environmental settings including hardware specific settings and software specific settings, said hardware and software settings being necessary to reconfigure said entire operating environment;
   transmitting the configuration parameter listing, including said system configuration parameters;
   losing system configuration information due to a system failure; and
   reconfiguring the system using the configuration parameter listing.

13. A data processing method for implementing catastrophic recovery aid to a system, comprising:
   receiving a queue for executing a configuration parameter listing script for a first system;
   requesting a configuration parameter listing for the first system;
   storing the configuration parameter listing for the first system, said list including environmental settings that define an operating environment for said first system, said environmental settings including hardware specific settings and software specific settings, said hardware and software settings being necessary to reconstruct said entire operating environment;
   receiving a queue for executing a configuration parameter listing script for a second system;
   requesting a configuration parameter listing for the second system, said list including environmental settings that define an operating environment for said second system, said environmental settings including hardware specific settings and software specific settings, said hardware and software settings being necessary to reconstruct said operating environment;
   storing the configuration parameter listing for the second system;
   detecting a system failure for one of the first or second system; and
   making the configuration parameter listing for the failed system available to an administrator.

14. A system for implementing catastrophic recovery aid to a system, comprising:
   executing means for executing a configuration parameter listing script;
   receiving means for receiving a configuration parameter list in response to executing the script, said list including environmental settings that define an operating environment for said system, said environmental settings including hardware specific, settings and software specific settings, said hardware and software settings being necessary to reconstruct said entire operating environment;
   storing means for storing the configuration parameter list;
   accessing means for accessing the configuration parameter list; and
   constructing means for constructing a configuration image file for a system using the configuration parameter list.

15. The system recited in claim 14, wherein the executing means for executing a configuration parameter listing script is performed locally.

16. The system recited in claim 14, wherein the executing means for executing a configuration parameter listing script is performed remotely.

17. The system recited in claim 14, wherein the executing means for executing a configuration parameter listing script is performed on a UNIX operating system.

18. The system recited in claim 14, wherein the storing means for storing the configuration parameter list further comprises accessing a remote memory.

19. The system recited in claim 14, wherein the storing means for storing the configuration parameter list further comprises writing the configuration parameter list to hard copy.

20. The system recited in claim 14, wherein the constructing means for constructing a configuration image file for a system is a manual operation.

21. The system recited in claim 14, wherein the constructing means for constructing a configuration image file for a system further comprises executing a reconstruction script that utilizes the configuration parameter list.

22. The system recited in claim 14, wherein the executing means for executing is performed based on time.

23. The method recited in claim 14, wherein the executing means for executing is performed based on execution parameters.

24. A data processing system for implementing catastrophic recovery aid to a system, comprising:
 executing means for executing a configuration parameter listing script;
 receiving means for receiving a baseline list of configuration parameters in response to executing the script, said configuration parameters being environmental settings that define an operating environment for said system, said environmental settings including hardware specific settings and software specific settings, said hardware and software settings being necessary to reconstruct said entire operating environment;
 re-executing means for re-executing the configuration parameter listing script;
 receiving means for receiving an updated list of configuration parameters in response to executing the script;
 comparing means for comparing the updated list of configuration parameters to the baseline list of configuration parameters; and
 modifying means for modifying the baseline list of configuration parameters to include configuration parameters on the basis of comparing.

25. A data processing system for implementing catastrophic recovery aid to a system, comprising:
 receiving means for receiving a request for a configuration parameter listing;
 determining means for determining system configuration parameters, said configuration parameters being environmental settings that define an operating environment for said system, said environmental settings including hardware specific settings and software specific settings, said hardware and software settings being necessary to reconstructs said entire operating environment;
 transmitting the configuration parameter listing;
 losing system configuration information due to a system failure; and
 reconfiguring means for reconfiguring the system using the configuration parameter listing.

26. A data processing system for implementing catastrophic recovery aid to a system, comprising:
 receiving means for receiving a queue for executing a configuration parameter listing script for a first system;
 requesting means for requesting a configuration parameter listing for the first system, said list including environmental settings that define an operating environment for said first system, said environmental settings including hardware specific settings and software specific settings, said hardware and software settings being necessary to reconstruct said entire operating environment;
 storing means for storing the configuration parameter listing for the first system;
 receiving means for receiving a queue for executing a configuration parameter listing script for a second system, said list including environmental settings that define an operating environment for said second system, said environmental settings including hardware specific settings and software specific settings, said hardware and software settings being necessary to reconstruct said operating environment;
 requesting means for requesting a configuration parameter listing for the second system;
 storing means for storing the configuration parameter listing for the second system; detecting means for detecting a system failure for one of the first or second system; and
 making means for making the configuration parameter listing for the failed system available to an administrator.

27. The method according to claim 1, further comprising the step of including data structure information within said environmental settings.

28. The method according to claim 27, further comprising the step of including data structure information within said environmental settings, said data structure information including physical-to-logical mapping information.

29. The method according to claim 27, further comprising the step of including information including volume group information.

30. The method according to claim 27, further comprising the step of including data structure information within said environmental settings, said data structure information including filesystem information.

31. The method according to claim 27, further comprising the step of including data structure information within said environmental settings, said data structure information including logical volume information.

32. The method according to claim 1, further comprising the step of including disk allocation information within said environmental settings.

33. The method according to claim 1, further comprising the step of including network interface information within said environmental settings.

34. The method according to claim 1, further comprising the step of including operational services information within said environmental settings.

35. The method according to claim 1, further comprising the step of including printer definition information within said environmental settings.

36. The method according to claim 1, further comprising the step of including software revision information within said environmental settings.

37. The system according claim 14 further comprising said environmental settings including data structure information.

38. The system according to claim 37, further comprising said data structure information including physical-to-logical mapping information.

39. The system according to claim 37, further comprising said data structure information including volume group information.

40. The system according to claim 37, further comprising said data structure information including filesystem information.

41. The system according to claim 37, further comprising said data structure information including logical volume information.

42. The system according to claim 14, further comprising said environmental settings including disk allocation information.

43. The system according to claim 14, further comprising said environmental settings including network interface information.

44. The system according to claim 14, further comprising said environmental settings including operational services information.

45. The system according to claim 14, further comprising said environmental settings including printer definition information.

46. The system according to claim 14, further comprising said environmental settings including software revision information.

* * * * *

UNITED STATES PATENT AND TRADEMARK OFFICE
CERTIFICATE OF CORRECTION

PATENT NO.   : 6,490,690 B1
DATED        : December 3, 2002
INVENTOR(S)  : Gusler et al.

It is certified that error appears in the above-identified patent and that said Letters Patent is hereby corrected as shown below:

Column 29,
Line 45, after "to", delete "reconstructs" and insert -- reconstruct --.

Column 30,
Line 14, after "system;", begin a new paragraph.
Line 28, after "including" delete "information including volume group information" and insert -- data structure information within said environmental settings, said data structure information including volume group information --.

Signed and Sealed this

Twenty-ninth Day of July, 2003

JAMES E. ROGAN
*Director of the United States Patent and Trademark Office*